Aug. 13, 1935.  M. J. LEONARD  2,010,922

GLASS GRINDING MACHINE

Filed Dec. 30, 1933  2 Sheets-Sheet 1

INVENTOR
Matthew J. Leonard
BY
ATTORNEYS

Aug. 13, 1935.  M. J. LEONARD  2,010,922
GLASS GRINDING MACHINE
Filed Dec. 30, 1933   2 Sheets—Sheet 2

INVENTOR
Matthew J. Leonard
BY
ATTORNEYS

Patented Aug. 13, 1935

2,010,922

UNITED STATES PATENT OFFICE 2,010,922

GLASS GRINDING MACHINE

Matthew J. Leonard, Detroit, Mich.

Application December 30, 1933, Serial No. 704,668

12 Claims. (Cl. 51—101)

The present invention pertains to a novel machine for grinding and polishing the edges of irregularly shaped plates of glass.

The primary object of the present invention is to provide a machine for grinding and polishing edges of automobile door and window glass where a smooth round edge and a definite shape are required. The machine includes a rotatable work support upon which plates of glass to be ground may be conveniently mounted and in combination therewith are provided several independently mounted and independently driven grinding and polishing wheels. Each wheel is carried by an individual pivoted arm which extends tangentially relative to the axis of rotation of the work table and tensioning means associated with each arm maintains contact between a pilot carried by each wheel and a pattern which is carried by the work table. The pattern corresponds in size and shape to which the glass is to be ground and in this manner the size and shape of the finished product are definitely controlled.

Another object of the present invention is to provide a machine for grinding and polishing edges of automobile and window glass wherein the shape and size are controlled by a pattern and wherein said pattern may be changed readily to adapt the machine for treating glass of different shapes and sizes.

Another object of the present invention is to provide a glass grinding machine including a work support which is adapted to be loaded with a supply of work while another supply of work carried by the same table is being ground and polished.

With the above and other ends in view the invention consists in matters hereinafter set forth and more particularly pointed out in the appended claims, reference being had to the accompanying drawings, in which

Like characters of reference are employed throughout to designate corresponding parts.

Figure 1:
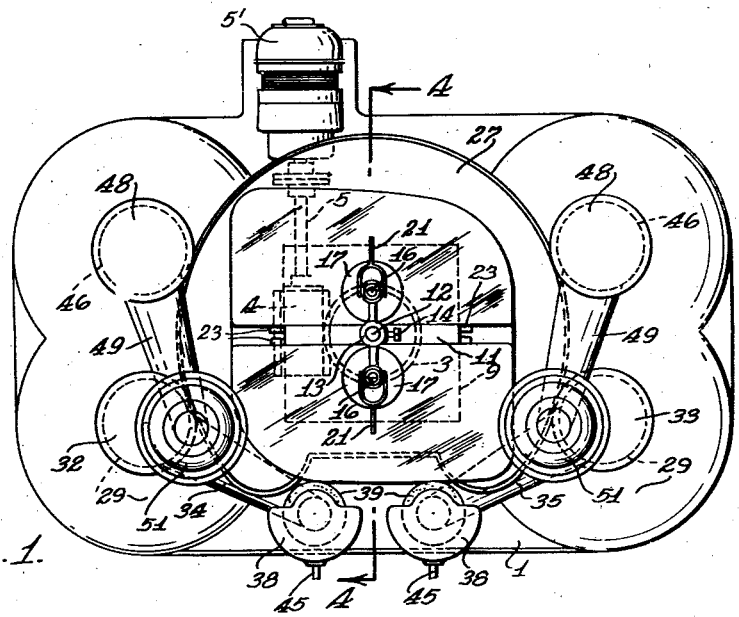
Figure 1 is a plan.
Figure 2:
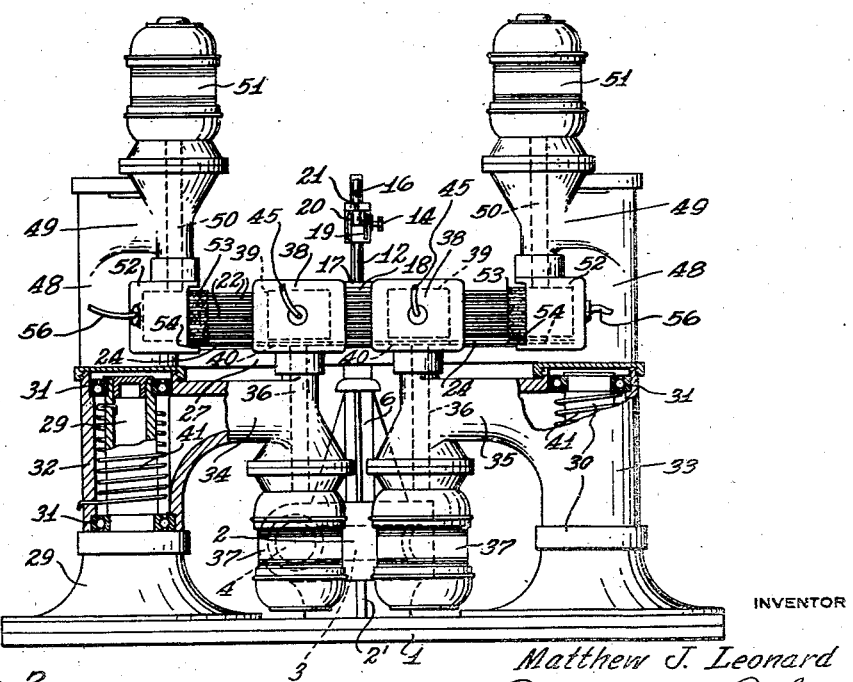
Fig. 2 is a front elevation with some of the parts in cross section.

The numeral 1 designates a base and mounted upon the base is a casing 2 enclosing and rotatably supporting a gear 3. Also enclosed and rotatably supported by the casing 2 is a worm 4 which is connected by a shaft 5 to an electric motor 5', the latter also being supported by the base 1. The casing 2 has a tubular extension 6 and supporting brackets 2', the latter providing the means of attachment to the base 1. Upon the upper end of the tubular part 6 are provided bearings 7 rotatably receiving a head 8 having secured thereto a work supporting table 9. A shaft 10 connects the head 8 to the gear 3 and inasmuch as the latter is in constant mesh with the worm 4 the shaft 10 and work table 9 are caused to rotate by operation of the motor 5.

The work table 9 is formed with a vertically extending wall 11, substantially intermediate and parallel to the side edges thereof as more clearly indicated in Fig. 1. Centrally disposed relative to the wall 11 and extending upwardly therefrom co-axial with the shaft 10 is a post 12 upon which is slidably received a bracket 13. Releasable securing means is indicated at 14 for holding the bracket in any position of adjustment on the post 12. The bracket 13 has radially extending arms 15 whose outer ends slidably receive rods 16 carrying disks 17 on their lower ends. On the lower faces of the disks are provided flexible pads 18, preferably formed of soft felt or rubber. Fixed to the rods 16 are collars 19 that are connected to the arms 15 by togggle links 20, the latter being provided with an operating lever 21.

Figure 3:
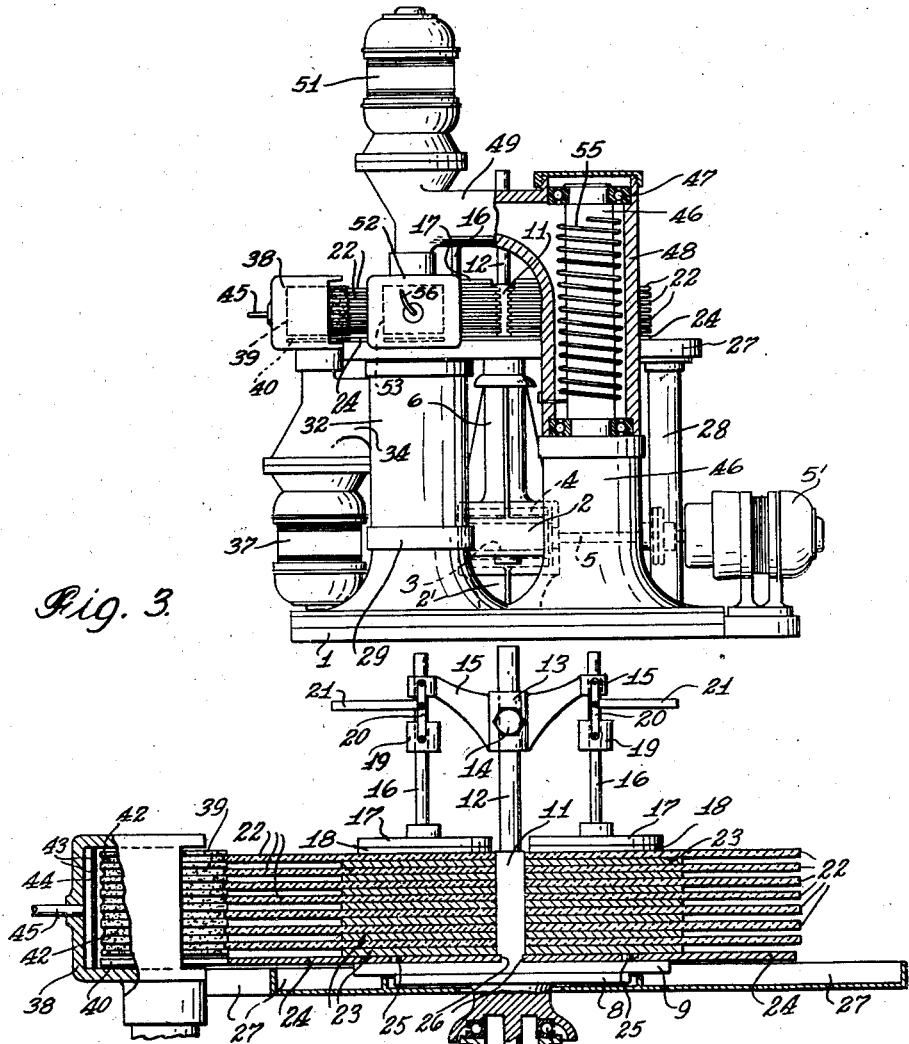
Fig. 3 is an end elevation with some of the parts in cross section.
Figure 4:
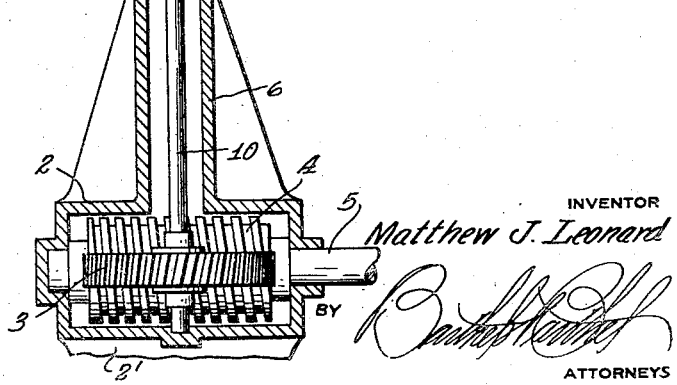
Fig. 4 is a view taken along the line 4—4 of Fig. 1.

The disks 17 may be raised or lowered by movement of the lever 21 to straighten the toggle 20 to its lowermost position shown in Fig. 4 or to break the toggle by movement of the lever upwardly from the position shown in this view. Thus the disks 17 serve to clamp a plurality of plates of glass 22 on the work table, it being noted that spacer plates 23 are interposed between the plates of glass and furthermore that patterns 24 are also clamped on the work table with the glass. Indexing means in the form of pins 25 on the work table 9 and grooves 26 in the wall 11 are provided to prevent movement of the patterns relative to the work table. Beneath the work table 9 is provided a pan 27 supported by suitable standards whose lower ends are attached to the base 1, one of such standards being shown at 28 in Fig. 3.

Attached to the base 1 adjacent to the front edge thereof are vertically extending spindles 29 and 30 supporting bearings 31 and upon which are rotatably received sleeves 32 and 33 respectively. Formed integral with the sleeves 32 and 33 are radially extending arms 34 and 35, each of which rotatably supports a shaft 36. The arms 34 and 35 are formed with depending brackets receiving an electric motor 37, the motors being connected to the shafts 36 to cause rotation of the latter. The upper ends of the shafts 36 project into aprons 38 and are connected to grinding and polishing wheels 39 which are disposed therein. Connected to the grinding wheels and shafts 36 are pilot disks 40, the latter, as more celarly shown in Fig. 4 being adapted to contact with the patterns 24. In order to maintain contact between the pilot disks 40 and the patterns 24 there are provided coiled springs 41 within the sleeves 32 and 33, one end of the springs being connected to the sleeves and the other ends being connected to the spindles 29 and 30 respectively. The springs 41 thus serve to resiliently urge sleeves 32 and 33 to rotate relative to the spindles 29 and 30 and thus swing the arms 34 and 35 so as to carry the pilot disks 40 into engagement with the patterns 24.

The grinding wheels are formed with a series of circumferential grooves 42 spaced apart a distance corresponding to the spacing of the glass plates 22 as a result of the use of the interposed spacers 23. In line with each groove there is provided an orifice 43 in a wall member 44 supported in the aprons 38. The wall 44 is provided to form a water or lubricant chamber into which water or lubricant may be supplied by a flexible hose 45 to be discharged through the orifices 43 into the grooves 42 of the grinding wheels.

Attached to the base 1 near the rear edge thereof and spaced on opposite sides of the work table 9 are a pair of vertically extending spindles 46 carrying bearings 47 upon which are rotatably supported sleeves 48. Each sleeve 48 has a radially extending arm 49 rotatably supporting a vertically disposed shaft 50. The upper ends of the shafts 50 are connected to electric motors 51 mounted on the arms 49 and the lower ends of the shaft 50 project into aprons 52 depending from the arms 49. In the aprons 52 and connected to the shaft 50 are grinding and polishing wheels 53 and pilot disks 54. Springs 55 are received in the sleeves 48 and have one end attached thereto and their other ends connected to the spindles 46 to resiliently urge rotation of the sleeves 48 in a direction to cause the arms 49 to carry the pilot disks 54 into engagement with the patterns 24. Water or lubricant supplying means similar to that shown and described in connection with Fig. 4 is also used in the aprons 52 and a flexible hose 56 is connected to each apron for supplying water or lubricant thereto.

In operation the several plates 22 of glass are placed on the work support 9 and on top of the pattern 24, the plates being lined up with the pattern 24. They are then clamped in place by movement of the lever 21 to straighten the toggle 20. The motor 5' is then operated to rotate the work table and the glass plates are thus carried into engagement respectively with the grinding wheels 53 and 39. The motors 37 and 51 cause the grinding wheels 39 and 53 to constantly rotate and therefore they act upon the edges of the plates 22 as they are carried around. The pattern 24 limits the amount of swinging movement of the arms 34 and 49 due to the engagement of the pilot disks 40 and 54 therewith and as a result of this limiting movement the glass plates are ground to a shape and size corresponding to that of the pattern.

The rate movement of the work as it is fed to the grinding wheels is comparatively slow and therefore it becomes possible to load one side of the work table while another load is being acted upon by the grinding wheels. This becomes possible by the provision of a double clamping means such as more clearly shown in Fig. 4 and because the spindles and sleeves are so arranged relative to the work table that the grinding wheels are all disposed on one side thereof. Thus the grinding operation is completed by travel of the work table through less than 180° and there results sufficient idle travel when the work is out of contact with all the grinding wheels to permit the finished work to be removed and a new load provided while still another load is being ground.

As will be seen, the pattern and the work are arranged in superposed relationship, so that the series of plates and the pattern can be readily assembled into what may be termed a work unit remote from the table, thereby enabling the work unit to be arranged to locate each plate to the best advantage for the grinding operation. With the unit thus prepared, it can be quickly placed in position on the table without requiring stoppage of the table for such positioning, the wall 11 enabling positioning to take place rapidly, with the clamping-means, also rapidly-operated, permitting the needed rapid securing of the work-unit in its position for grinding.

With each grinding unit operating as an individual, and having its presenting movement in directions normal to the axis of the table, and with the axes of rotation of the grinding faces parallel with the axis of rotation of the table, each grinding unit can carry its individual pilot structure which will co-operate with the pattern to limit the presenting movement of the unit, the movement of the unit in the opposite direction being unlimited excepting by the spring resistance which is active to set up the presenting movement.

By this arrangement the two control elements—the pattern of the work unit and the pilot of the grinding unit—are directly associated with their respective units and partake of their respective movements—the pattern moving with the work on the table, while the pilot moves with the grinding unit during its presenting movements. Hence, the grinding faces will provide grinding action on the plate edges as long as the pilots remain out of contact with the pattern, each grinding unit being effective to grind under the pressure of its spring as the plates are moving past the grinding point of the unit, the next grinding unit then continuing the operation, until each unit position has been passed; obviously, if the work has been ground down to the proper point at one of the earlier unit stations, the contact of the pilot of a succeeding unit with the pattern will prevent further abrasive action.

In other words, the periphery of the work is caused to pass a succession of unit stations, in each of which the grinding unit is operative to provide abrading action, if permitted by the relationship of pilot and pattern. Hence, the work to be done can be divided between the stations, with neither station required to complete the grinding, although such completion is possible at each of the stations. As a result, the work-unit, after positioning, requires no attention on the part of the attendant, the structure being self-controlling as to abrading action, as the table continues to slowly rotate. Obviously, grinding will take place initially at the "high points" of the assembled work-unit, so that as the succeeding stations are encountered, the periphery is ground to a greater extent until the final station is reached at which time the contour will have so nearly approached the pattern that final abrading action will produce the desired product; should this result obtain at an earlier station, the co-operation of pilot and pattern at the succeeding stations prevents further abrading action.

This is made possible by the arrangement of the stations and the grinding units. As indicated in the drawings, the stations themselves are grouped about the table so as to occupy less than 180° of the table circumference. This places the stations in close relation, since the table diameter, while of a size to receive two work-units concurrently, is sufficiently small as to permit the attendant to readily and rapidly position the work-unit on the travelling table. To permit the close location of stations, and at the same time permit of the yieldability of the grinding unit at the station, the units are arranged as shown, two of them being supported below the plane of the table while the other two are supported above such plane, thus making possible a reasonable radial length of arm for the swinging grinding unit, and at the same time enable the table top to be open for the removal and reception of the work-units while the table is in motion.

It becomes obvious that the shape of the finished product is governed by the shape of the pattern and that the present machine is capable of removing irregularities of a wide range and that by changing the pattern it may be adapted for grinding either convex or concave shapes.

Although a specific embodiment of the present invention has been illustrated and described it is to be understood that various changes may be made within the scope of the appended claims without departing from the spirit of the invention, and such changes are contemplated.

What I claim is:—

1. As a means for grinding contour edges of glass plates to a predetermined contour, a work-supporting table rotative on a vertical axis, means for clamping a contour pattern and the work to said table with the work and pattern in superposed relation to present characteristics of a work-unit, and a plurality of individual and individually-driven rotatable grinding units positioned to yieldingly present their grinding faces to the work as the table rotates with the direction of presenting movement normal to the axis of table rotation, each grinding unit having means adapted to co-operate with the pattern to limit the presenting movement of the unit when co-operation is permitted by the work, the direction of yield of a unit being free.

2. Means as in claim 1 characterized in that the respective stations of the grinding faces are located within an angular distance less than 180° of the table periphery, whereby removal and positioning of work-units is permitted during table rotation and during abrading activity.

3. Means as in claim 1 characterized in that the table top carries an upstanding wall extending on a diameter of the table to form a guide for the positioning of the work-unit.

4. Means as in claim 1 characterized in that the table top carries an upstanding wall extending on a diameter of the table to constitute a positioning guide for work-units, said wall providing a support for a pair of individually-operated clamping elements which co-operate with the table in forming the clamping means for the work-units, whereby the work and pattern may be positioned and clamped as a unit.

5. Means as in claim 1 characterized in that the clamping means includes a pair of clamp elements carried by and adjustable vertically relatively to the table top, each element being operable individually and including a structure of toggle characteristic to permit rapid movement of the clamping face to and from the positioned work.

6. Means as in claim 1 characterized in that each grinding unit includes an arm swingable on a vertical axis with the free end of the arm carrying the grinding element and power mechanism relatively positioned on opposite sides of the arm and adapted to provide grinding element activity on a vertical axis.

7. Means as in claim 1 characterized in that the grinding units each include an arm swingable on a vertical axis, with the free end of the arm carrying the grinding element and its power mechanism operative to rotate the grinding element on a vertical axis, at least one of said arms having its swinging movements below the plane of the table.

8. Means as in claim 1 characterized in that the grinding units each include an arm swingable on a vertical axis, with the free end of the arm carrying the grinding element and its mechanism operative to rotate the element on a vertical axis, at least one of said arms having its swinging movements above the plane of the table.

9. Means as in claim 1 characterized in that the grinding units each include an arm swingable on a vertical axis, with the free end of the arm carrying the grinding element and its mechanism operative to rotate the element on a vertical axis, at least one of said arms having its swinging movements below the plane of the table top, while at least another of said arms has its swinging movements above the plane of such table.

10. As a means for grinding contour edges of glass plates to a predetermined contour, a work-supporting table rotative on a vertical axis, means for clamping a contour pattern and the work to said table with the work and pattern in superposed relation to present characteristics of a work unit, and a power-driven grinding unit positioned to yieldingly present its grinding face to the work as the table rotates with the direction of presenting movement normal to the axis of table rotation, said grinding unit including a fixed support, an arm carried by the support with the arm having a vertically-extending portion adapted to co-operate with the support to provide a pivotal relationship between said portion and the support on a vertical axis, a spring connecting the portion and support and arranged to yieldingly swing the free end of said arm in the direction of the table axis, the free end of said arm carrying a grinding element and its power mechanism adapted to rotate the element on a vertical axis, the grinding element being positioned relative to the table top to cause the element contact the positioned work-unit as the table moves the latter past the presenting station of the element, said element including a pilot formation adapted to co-operate with the pattern to limit the extent of presenting movement of the element.

11. Means as in claim 10 characterized in that the arm is positioned to swing in a plane below the plane of the table top.

12. Means as in claim 10 characterized in that the arm is positioned to swing in a plane above the plane of the table top.

MATTHEW J. LEONARD.